United States Patent [19]

Harvey

[11] Patent Number: 4,978,167
[45] Date of Patent: Dec. 18, 1990

[54] BICYCLE SADDLE WITH BODY SUPPORT

[76] Inventor: Henry R. Harvey, Box 207, Lahaska, Pa. 18931

[21] Appl. No.: 439,109

[22] Filed: Nov. 20, 1989

[51] Int. Cl.⁵ .............................................. B60N 2/38
[52] U.S. Cl. .................................................... 297/195
[58] Field of Search ......................... 294/201, 195, 243

[56] References Cited

U.S. PATENT DOCUMENTS

| 565,880 | 8/1896 | Cleveland | 280/202 |
|---|---|---|---|
| 603,545 | 5/1898 | Williams | 280/202 |
| 626,852 | 6/1899 | Bemis | 297/195 X |
| 3,092,362 | 6/1963 | Walsh | 297/243 X |
| 3,497,258 | 2/1970 | Hill | 297/195 |
| 3,754,787 | 8/1973 | Garber | 297/217 X |
| 4,411,443 | 10/1983 | Pollard | 280/281 LP |
| 4,650,249 | 3/1987 | Serber | 297/195 X |

FOREIGN PATENT DOCUMENTS 444340  1/1949  Italy .................................... 297/195

Primary Examiner—Peter A. Aschenbrenner
Attorney, Agent, or Firm—William H. Eilberg

[57] ABSTRACT

A bicycle saddle includes a saddle shell and a support member, the support member extending upwardly and forwardly of the bicycle. The support member is attached to a cushion which is positioned to support the body of the rider. The cushion enables the rider to lean forward, in comfort, for long periods of time, while remaining in a favorable aerodynamic position. The saddle shell and support member are preferably integrally formed. The shell is connected to the bicycle frame at a pivot point, and is also connected to the frame by a spring. The saddle shell and support member can rotate as a unit, around the pivot point, relative to the bicyle frame. The saddle also includes an adjustment mechanism which limits the amount of rotation. This mechanism includes a bolt connecting the saddle shell and seat frame, the bolt having a stop nut and a thumb wheel. Adjustment of the thumb wheel, which can be done while the rider is on the bicycle, controls the amount of permitted rotation of the saddle shell. The present invention can be used in place of a conventional saddle on virtually any bicycle.

11 Claims, 2 Drawing Sheets

BICYCLE SADDLE WITH BODY SUPPORT

BACKGROUND OF THE INVENTION

This invention relates to the field of bicycles. In particular, the invention includes a saddle structure which supports the body of the rider, and distributes the rider's weight so as to maximize comfort.

It has been known that a bicycle rider can minimize air resistance by leaning forward while riding. For this reason, modern bicycles are often equipped with "dropped" handlebars which help the rider to assume a position which minimizes aerodynamic drag. It has also been known to provide handlebars which act as supports for the cyclist's elbows. By resting the elbows on the handlebars, it is at least theoretically possible to maintain an aerodynamically favored riding posture for a long period of time.

In practice, however, the above-described arrangements have serious disadvantages. By resting the elbows on the handlebars, the cyclist is concentrating weight on a part of the body that is not well padded, causing discomfort after extended periods of riding. Also, by leaning forward on the handlebars, the cyclist can cause damage to the ulnar nerve of the hand. When the rider leans heavily on the handlebars for a long time, the ulnar nerve may eventually become numb. If the nerve is continually abused, it can become permanently damaged.

Another problem encountered with handlebars designed to support the rider's elbows is that the steering portions of the handlebars are inherently close together, thus making the bicycle unstable.

Still another problem with bicycles of the prior art is the concentration of the rider's weight on a relatively small area of the seat. This problem arises regardless of whether the bicycle is equipped with dropped handlebars. Long hours of riding can cause extreme discomfort to the rider's rear end, even when the seat is padded.

One means of reducing some of the above-described problems is to provide an auxiliary support for the rider's body, so that the rider need not concentrate so much weight on the handlebars. Some such supports have been shown in the prior art. For example, U.S. Pat. No. 626,852 shows a bicycle having a body support. The latter patent provides a means whereby the bicycle can be propelled by hand; the body support makes it easier for the rider to propel the bicycle.

Other patents showing auxiliary supports for the body of a bicycle rider are U.S. Pat. Nos. 565,880 and 603,545. The former patent shows a pair of pads which are mounted to the head of the bicycle frame, forward of the handlebars. The latter patent shows a pair of padded, crutch-like supports which are connected to the bicycle frame at a point near the handlebar spindle.

In bicycle technology, very small variations in the angles between the components of the frame can cause big differences in performance of the bicycle. Variations of one or two degrees can sometimes mean the difference between superior performance and mediocre results. Similarly, the angle made by the bicycle seat, relative to the frame, can be critical. Seat manufacturers take extreme care to assure that their seats are finely adjustable to within one or two degrees. Small changes in the angle of the seat are very important, as they are readily perceptible by even the casual cyclist. A change of one or two degrees in the angle of inclination of the bicycle seat can mean the difference between a feeling of stability and a feeling that one is about to slide off the bicycle.

The present invention provides a novel saddle structure which solves the problems described above, in a more effective manner than that of the prior art. The invention enables a bicycle rider to assume an aerodynamically favored position, while also maximizing riding comfort by distributing the rider's weight more evenly. The invention also improves the stability of the bicycle, and enables the rider to propel the bicycle with greater efficiency. The invention provides virtually infinite adjustability in the angle of inclination of the seat, thereby adding to the perceived stability of the bicycle. The invention is also easy to manufacture, and can be readily incorporated into existing bicycles.

SUMMARY OF THE INVENTION

The present invention includes a bicycle saddle, the saddle comprising a saddle shell attached to the bicycle frame. The saddle shell is integrally formed with a support member which extends upwardly and forwardly, relative to the bicycle. The saddle shell is preferably cushioned, and the support member is preferably attached to a cushioned member which is positioned to support the body of the rider.

The saddle shell is attached to the bicycle frame in two places. One of these is a pivot point, which enables the saddle shell and support member to rotate together, relative to the bicycle frame. The other point of attachment is near the rear of the saddle. There, a resilient means, such as a spring, connects the saddle shell to the bicycle frame. Located near the resilient means is an adjustment mechanism which determines the amount by which the saddle shell and support member can rotate.

In using the invention, the bicycle rider leans forward, against the cushioned member, while riding, thereby assuming an aerodynamically favored position. When the rider leans forward, the saddle shell and support member rotate around their pivot point. Thus, the cushioned member moves downward and the rear of the saddle moves upward. When the rider leans backward, the opposite occurs. The maximum amount of rotation is controlled by the setting of the adjustment mechanism.

It is therefore an object of the invention to provide a bicycle saddle having a body support integrally formed with the saddle.

It is another object to provide a bicycle saddle as described above, wherein the saddle and body support can rotate relative to the bicycle frame.

It is another object to enable a bicycle rider to assume an aerodynamically favored position for a long period of time.

It is another object to minimize aerodynamic drag on a cyclist, while maximizing comfort and stability.

It is another object to provide a bicycle saddle whose angle of inclination, relative to the bicycle frame, is continuously variable.

It is another object to reduce the discomfort and bodily injury experienced by cyclists with bicycles of the prior art.

It is another object to reduce the amount of weight, of the rider's body, which is concentrated on the bicycle seat, and thereby to reduce discomfort to the rider.

It is another obJect to reduce or eliminate damage to the ulnar nerve, due to extended pressure of the hands on the handlebars.

It is another object to provide a bicycle saddle, as described above, which saddle is easy to manufacture and easy to install on existing bicycles.

Other objects and advantages of the invention will be apparent to those skilled in the art, from a reading of the following brief description of the drawings, the detailed description of the invention, and the appended claims.

DETAILED DESCRIPTION OF THE INVENTION

Figure 1:
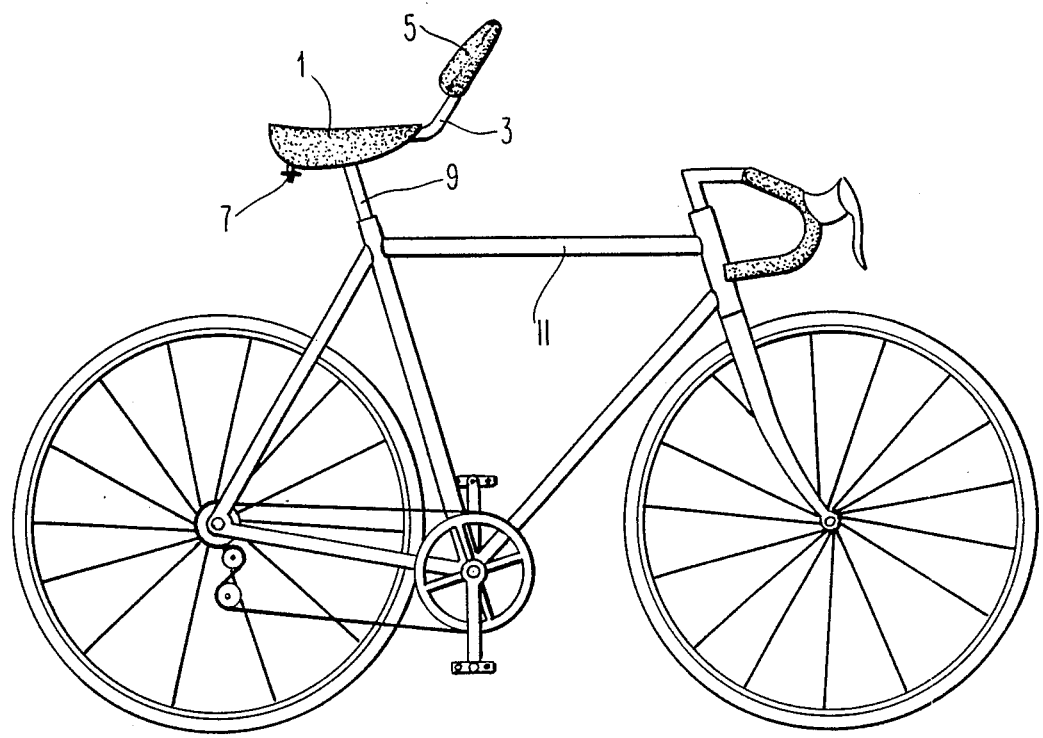
FIG. 1 is a side elevational view of a bicycle equipped with the saddle and body support of the present invention.

FIG. 1 shows a bicycle on which the saddle of the present invention has been installed. The invention includes saddle 1, the saddle being attached to support member 3. The saddle includes a cushioned portion and an underlying shell (not shown in FIG. 1). Preferably, support member 3 is integrally formed with the saddle shell, but it could also be separately formed and suitably joined. The support member is connected to cushioned member 5 which is intended to support the body of the rider. FIG. 1 also shows adjustment mechanism 7; the latter item will be described in more detail below.

In this specification, the term "saddle structure" is used to refer to the combination of the saddle shell, the support member, and the cushioned member.

The saddle structure is connected to stem 9 which is connected to bicycle frame 11. The other elements of the bicycle shown in FIG. 1 are conventional, and are intended to be exemplary and not limiting. The present invention is not limited to bicycles having the exact structure shown in FIG. 1.

Figure 2:
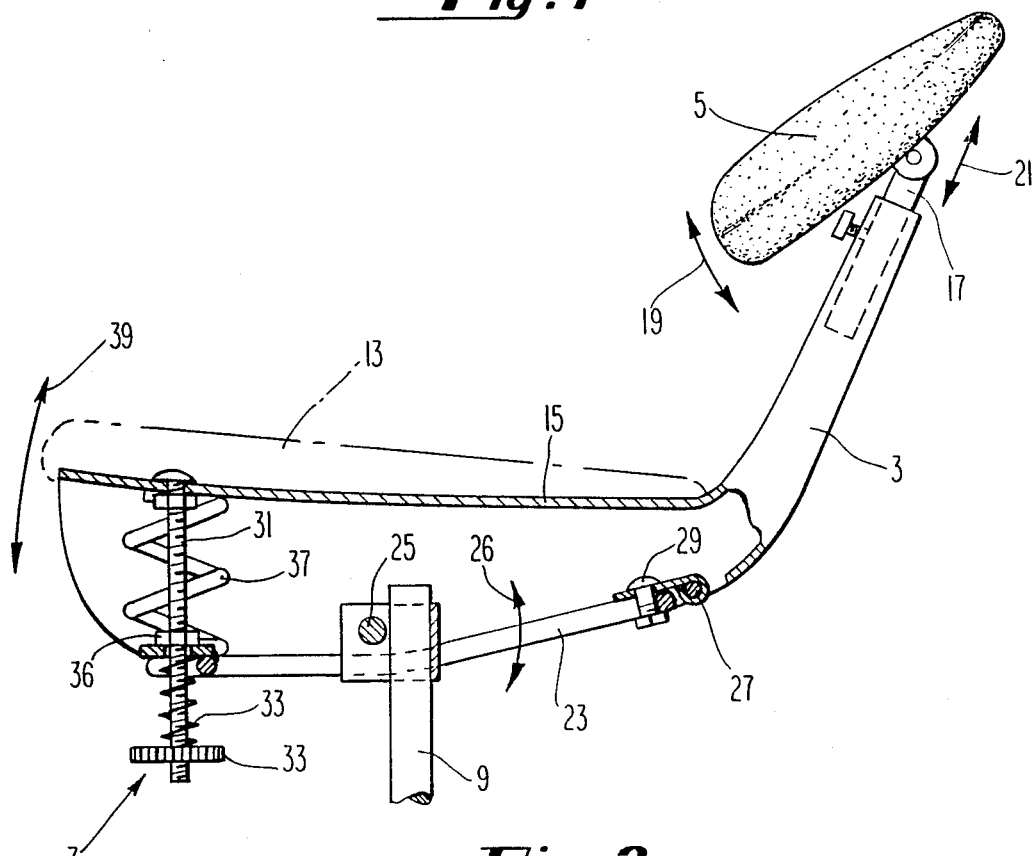
FIG. 2 is a side view of the saddle and body support, partially broken away, and partially in cross-section.

FIG. 2 shows more details of the saddle structure of the present invention. The bicycle saddle includes saddle cushion 13 mounted over a rigid saddle shell 15. The cushion 13 is preferred, though not absolutely necessary, and is made of any suitable padded material. As stated above, the saddle shell is connected, preferably integrally, with support member 3. The support member holds cushioned member 5 by a telescoping mounting means 17. The position of the cushioned member can be varied as shown by arrows 19 and 21, by pivoting the cushioned member and/or by moving the telescoping mount into or out of the support member.

The saddle shell is supported by seat frame 23, the seat frame being rigidly connected to stem 9. The seat frame may be permitted to pivot relative to the stem, as at pivot point 25, in the directions indicated by arrow 26. The latter pivot point is conventional, and does not form part of this invention; the latter adjustment is equivalent to the coarse adjustment which is possible on many conventional bicycles. For purposes of this invention, the seat frame should be considered to be part of the bicycle frame.

The saddle shell is connected to the seat frame at two locations, one near the front and one near the rear of the saddle. The first such location is pivot point 27. Near the pivot point 27 is bolt 29, which helps to connect the saddle shell to the seat frame. The connection means at the rear of the saddle includes springs 37. The springs are more clearly visible in the rear view of FIG. 4. The springs are of sufficient stiffness that they tend to hold the saddle shell and seat frame apart, but sufficiently resilient that they allow for some movement, and dampen the shock and vibrations transmitted through the frame. The exact position of the springs (or other, equivalent connection means) is not critical, but it is necessary that they be spaced apart from the pivot point, to allow the desired rotation of the saddle structure.

Figure 4:
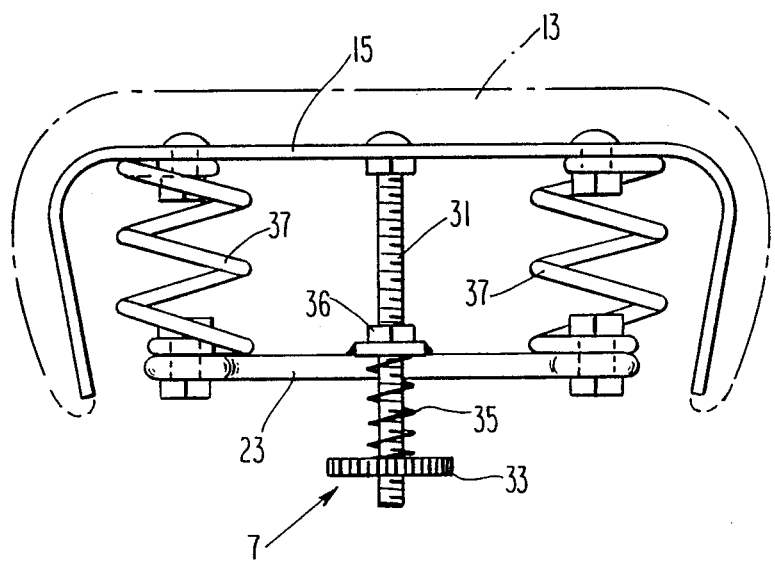
FIG. 4 is a rear view of the saddle portion of the present invention.

Bolt 31 acts as part of an adjustment mechanism to control the amount of rotation of the saddle structure. This bolt passes first through the saddle shell, then through the space between the saddle shell and the seat frame, and then through the seat frame. The bolt extends below the seat frame, and has a thumb wheel 33 at its lower end. A spring 35 is disposed around the portion of bolt 31 which is between the thumb wheel and the seat frame. Stop nut 36 determines the maximum amount by which the bolt can protrude through the seat frame. As shown in FIGS. 2 and 4, the stop nut is located on the upper side of the frame, and the thumb wheel is located on the lower side of the frame.

Figure 3:
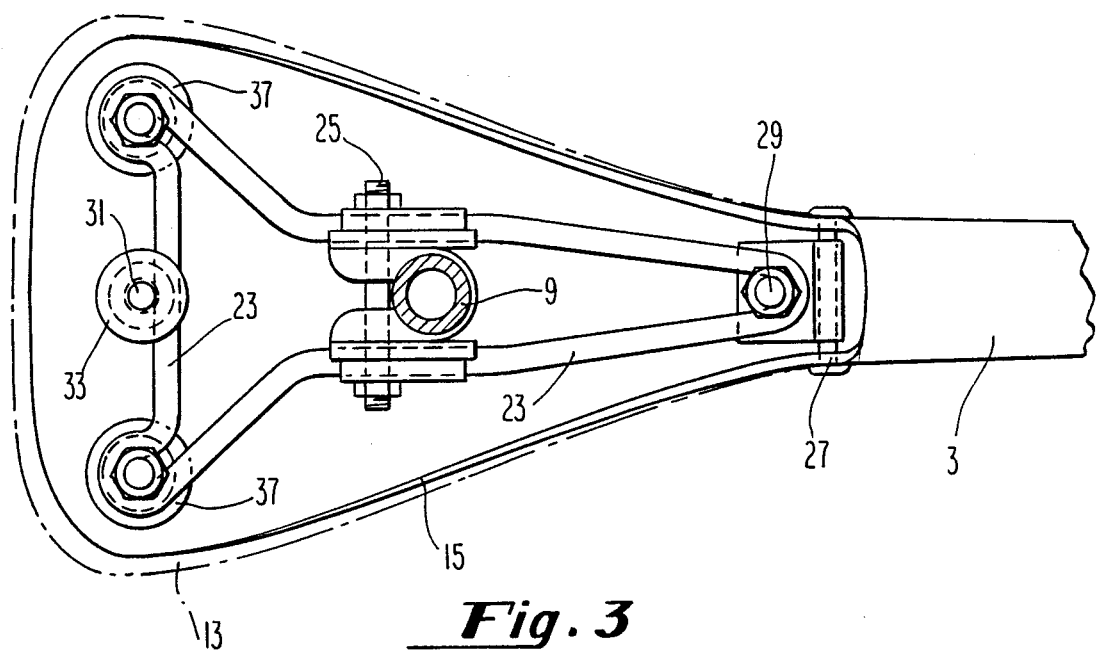
FIG. 3 is a bottom view of the saddle portion of the present invention.

FIG. 3 is a view from the bottom of the saddle, showing more details of its structure. Stem 9 is shown in cross-section. The seat frame 23 is shown to include three members forming a generally closed loop; the seat frame can assume other forms, within the scope of the invention.

Saddle shell 15 and support member 3 can rotate around pivot point 27, in the directions indicated by arrow 39. When the rider leans forward, the rider's body presses against cushioned member 5, and the cushioned member, the support member 3, and the saddle shell 15 and cushion 13 rotate together, as a unit, such that the cushioned member moves downward and the rear of the saddle moves upward. When the rider leans backward, the opposite occurs.

The settings of the thumb wheel and stop nut govern the amount of rotational motion of the saddle structure. The movement of the saddle shell is limited by the distance between the stop nut and the thumb wheel. The setting of the thumb wheel can be varied by the rider at all times, even while riding, and the amount of pivoting motion can therefore be continuously varied.

The entire saddle structure therefore moves as a unit, while being spring-suspended, by springs 37. The structure is thus relatively isolated from the shock and vibration which is transmitted through the frame.

Due to the pivoting motion of the saddle shell and support member, the rider may rest comfortably against cushioned member 5 whether he or she is in the upright position, or in a position which minimizes aerodynamic drag (i.e. with hands on the lower portions of the dropped handlebars), or in any intermediate position.

The pivoting motion of the saddle shell and support member is important for another reason. As the cyclist thrusts his or her torso forward, there is a tendency for the lower portion of the body to slide backward. But since the rear portion of the saddle rises as the cyclist's body presses against the cushioned member 5, the latter tendency is counteracted, and the rider experiences enhanced comfort and stability.

Another feature of the present invention is its ability to adjust continuously the angular position of the saddle. Even small shifts in the distribution of the weight of the rider's body can cause small changes in the angular position of the saddle and support member. Thus, the invention allows the rider to adjust the position of these structures by simple body movements. The adjustment can be made in extremely small increments.

The present invention is extremely comfortable because it shifts much of the weight of the rider from the seat, and/or the handlebars, to the body support. Much of the discomfort due to riding is the result of the fact that the rider's weight is concentrated in certain small areas. Thus, in most conventional bicycles, most of the rider's weight is normally concentrated on the relatively small area of the seat. After several hours of riding, the rider can experience considerable pain in the rear, even where a padded saddle is used. Moreover, with bicycles which permit the rider to lean his or her elbows on the handlebars, the pressure on the elbows is itself uncomfortable after an extended period. With the present invention, the pressure exerted on the saddle is reduced by more than 50%. The pressure on the handlebars is also substantially reduced. Thus, the invention substantially increases the length of time the rider can comfortably ride without dismounting.

The present invention also serves as a safety device. The cushioned member 5 tends to prevent the rider from being suddenly thrown forward. Also, in the event of an accident, the cushioned member may absorb some of the shock of a collision. Without this cushion, there is virtually nothing to prevent the rider from suffering serious injury.

Another advantage of the present invention is that the motion of cushioned member 5 is dampened because it is attached to the spring-loaded seat. Moreover, the movement of the seat is itself dampened by the weight of the rider's body. Thus, the present invention minimizes the amount of physical shock transmitted to the rider.

Although the invention has been described with respect to a particular embodiment, the invention can be modified in various ways. For example, one can provide two bolts, in place of bolt 31, and these bolts could be located within the large springs 37. Thus, in the latter arrangement, the rider would be able to exercise more precise control over the rotation of the saddle shell.

Another possible modification is in the curvature of support member 3. In the embodiment shown in the figures, the support member curves immediately upwardly and forwardly of the seat. Alternatively, the support member could extend generally forwardly of the seat, and then could curve backwardly and upwardly. The net effect would still be that the support member extends upwardly and forwardly of the bicycle, but the configuration of the support member would be different. The latter arrangement would be especially suitable for mountain bicycling, where the rider is likely to spend some of the time standing on the pedals while leaning forward. The latter arrangement would allow more room for the rider's crotch. It is, of course, possible to provide still more variations in the shape of the support member. All of the above-mentioned variations are intended to fall within the scope of the invention.

Other modifications are possible. The particular structure of the bicycle is not significant; the invention is intended for use with virtually any bicycle. The structure of the seat frame is therefore not critical to the invention, as long as it provides a rigid means of connection to the saddle shell, and an appropriate pivot point. The invention is also not to be limited by the type of cushions used on the saddle shell and/or with the support member. These and other modifications should be deemed within the spirit and scope of the following claims.

What is claimed is:

1. A saddle structure for a bicycle, the bicycle having a frame, the bicycle having front and back ends, the saddle structure comprising a saddle, the saddle including a saddle shell and a cushion connected to the shell, the saddle shell being integrally formed with a support member, the support member extending upwardly and towards the front end of the bicycle, the support member being connected to a cushioned member, the cushioned member being positioned to support the chest of a rider, the saddle shell and the frame being connected at a pivot point, the saddle shell and frame also being connected by resilient means, the resilient means being spaced apart from the pivot point, wherein the saddle shell and support member can rotate together about the pivot point, the structure further comprising means for controlling the amount by which the saddle shell and support member can rotate, wherein the controlling means comprises a bolt extending through the saddle shell and through the frame, the bolt having a stop nut and a thumb wheel, wherein the distance between the stop nut and thumb wheel determines the amount by which the saddle shell and support member can rotate.

2. In a bicycle, the bicycle having a frame and a saddle, the bicycle having front and back ends, the saddle a including a saddle shell which is attached to the frame, the improvement wherein the saddle shell is integrally formed with a support member, the support member extending upwardly and towards the front end of the bicycle, both the saddle shell and the support member being attached to cushion means, and wherein the saddle shell and support member can rotate together around said pivot point, further comprising means for limiting the rotational motion of the saddle shell, wherein the limiting means comprises a bolt inserted through the saddle shell and through the frame, the bolt having a stop nut located on the upper side of the frame and a thumb wheel located on the lower side of the frame.

3. A saddle structure for a bicycle, the bicycle having a frame, the bicycle having front and back ends, the saddle structure comprising a saddle shell and a support member connected to the shell, the support member extending upwardly and towards the front end of the bicycle, the support member comprising means for supporting the chest of a user, the saddle shell being connected to the frame at a pivot point, the saddle shell also being connected to the frame by a connection means, spaced away from said pivot point, wherein the connection means permits the saddle shell to rotate around the pivot point, wherein the connection means comprises at least one spring attached to the saddle shell and the frame, the spring being sufficiently stiff that it tends to hold the saddle shell and the frame apart, wherein the connection means also includes means for limiting the pivoting motion of the saddle shell, and wherein the limiting means comprises a bolt inserted through the saddle shell and through the frame, the bolt having a stop nut located on the upper side of the frame and a thumb wheel located on the lower side of the frame.

4. The saddle structure for a bicycle, the bicycle having a frame, the bicycle having front and back ends, the saddle structure comprising a saddle shell and a support member connected to the shell, the support member extending upwardly and towards the front end of the bicycle, the support member comprising means for supporting the chest of a rider, the saddle shell being connected to the frame at a pivot point, the saddle shell also being connected to the frame by a spring, the spring being spaced away from said pivot point, and wherein the spring, the saddle shell, and the support member together comprises mean for enabling the rider to adjust the angle of the saddle and support member by a controlled and continuously variable amount, and to remain in any desired angular position while riding.

5. The saddle structure of claim 4, further comprising means for limiting the pivoting motion of the saddle shell and for adjusting the maximum possible angle through which the saddle and support member can pivot.

6. The saddle structure of claim 4, wherein the support member is connected to a cushion which is positioned to contact the chest of the rider.

7. In a bicycle, the bicycle having a bicycle frame defining a stem, the stem supporting a saddle, the bicycle having front and back ends, the saddle including a saddle shell and a seat frame, the seat frame being attached to the bicycle frame at the stem, the improvement wherein the saddle shell is integrally formed with a support member, the support member extending upwardly and towards the front end of the bicycle, the support member comprising means for supporting the chest of a rider, wherien the saddle shell is attached to the seat frame at a pivot point, wherein the saddle shell and support member can rotate together around said pivot point, and wherein the pivot point is spaced from the stem, in the direction towards the front end of the bicycle.

8. The improvement of claim 7, wherein the support member is connected to a cushion which is positioned to contact the chest of the rider.

9. The saddle structure of claim 7, further comprising means for limiting the pivoting motion of the saddle shell and for adjusting the maximum possible angle through which the saddle and support member can pivot.

10. A saddle structure for a bicycle, the bicycle having a frame, the bicycle having front and back ends, the saddle structure comprising a saddle shell and a support member connected to the shell, the support member extending upwardly and towards the front end of the bicycle, the support member comprising means for supporting the chest of a rider, the saddle shell being connected to the frame at a pivot point, the saddle shell also being connected to the frame by a connection means, spaced away from said pivot point, wherein the connection means permits the saddle shell to rotate around the pivot point, wherein the connection means also includes mean for limiting the pivoting motion of the saddle shell and for adjusting the maximum possible angle through which the saddle shell and support member can pivot.

11. A method of riding a bicycle, the bicycle having a frame, the bicycle having front and back ends, the method comprising the steps of:
(a) providing a saddle structure having a saddle portion and a support member connected to the saddle portion, the support member extending upwardly and towards the front end of the bicycle, the saddle structure being connected to the frame at a pivot point,
(b) leaning forward on the support member so as to cause the saddle portion and support member to rotate around the pivot point, and
(c) varying the setting of an adjustment member so as to limit the amount by which the saddle portion and support member can rotate.

* * * * *